United States Patent
Wang et al.

(10) Patent No.: US 12,119,555 B2
(45) Date of Patent: Oct. 15, 2024

(54) ANGLE-OF-ARRIVAL ANTENNA SYSTEM

(71) Applicant: Maxim Integrated Products, Inc., San Jose, CA (US)

(72) Inventors: Jianwei Wang, Beaverton, OR (US); Michael Alan Fredd, Tigard, OR (US); Junqiang Wu, Beaverton, OR (US); Dipak Kumar Desai, Frisco, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 400 days.

(21) Appl. No.: 17/535,214

(22) Filed: Nov. 24, 2021

(65) Prior Publication Data

US 2023/0125795 A1    Apr. 27, 2023

Related U.S. Application Data

(60) Provisional application No. 63/118,348, filed on Nov. 25, 2020.

(51) Int. Cl.
| | |
|---|---|
| *H01Q 21/24* | (2006.01) |
| *G01S 3/04* | (2006.01) |
| *H01Q 1/48* | (2006.01) |
| *H01Q 9/04* | (2006.01) |

(52) U.S. Cl.
CPC ............ *H01Q 21/24* (2013.01); *G01S 3/043* (2013.01); *H01Q 1/48* (2013.01); *H01Q 9/0421* (2013.01)

(58) Field of Classification Search
CPC .. G01S 3/043; G01S 3/46; H01Q 1/48; H01Q 21/08; H01Q 21/24; H01Q 25/001; H01Q 9/0421
See application file for complete search history.

(56) References Cited

U.S. PATENT DOCUMENTS

| | | |
|---|---|---|
| 2019/0006751 A1 | 1/2019 | Chen et al. |
| 2020/0021011 A1 | 1/2020 | Cooper et al. |
| 2020/0186180 A1 | 6/2020 | Park et al. |

FOREIGN PATENT DOCUMENTS

WO    WO 2018/060662 A1    4/2018

OTHER PUBLICATIONS

International Application No. PCT/US2021/060816 International Search Report and Written Opinion dated Mar. 7, 2022, 15 pages.

*Primary Examiner* — Timothy X Pham
(74) *Attorney, Agent, or Firm* — Cozen O'Connor

(57) ABSTRACT

An angle-of-arrival antenna system uses two orthogonal arrays of patch antenna elements to measure the angle of arrival of a wireless signal irrespective of its polarization. Each antenna element has an antenna patch located over a corresponding ground patch. A shorting wall directly electrically connects one edge of the antenna patch to a corresponding edge of the underlying ground patch. The edge of the ground patch is also directly connected to a system ground plane. No other edges of the ground patch are connected to the system ground plane. The shorting wall acts as an impedance that isolates the ground patch from the system ground plane, and therefore improves isolation between the antenna elements. The antenna system may be constructed using conventional circuit-board fabrication techniques by implementing each shorting wall as an array of plated through-holes or slots.

19 Claims, 13 Drawing Sheets

ANGLE-OF-ARRIVAL ANTENNA SYSTEM

RELATED APPLICATIONS

This application claims priority to U.S. Provisional Patent Application No. 63/118,348, filed Nov. 25, 2020, the entirety of which is incorporated herein by reference.

BACKGROUND

The angle of arrival (AOA) of a signal is the direction from which the signal is received. The signal may be electromagnetic signal (e.g., radio-frequency or microwave) propagating through air or space. In this case, an antenna array receives the electromagnetic signal, from which the AOA is calculated based on the time difference of arrival (i.e., measured phase differences) between the elements of the array. AOA measurements are used for radiolocation and radio direction finding. Applications include multiangulation and multilateration, mobile phone tracking, radar, location-based services, and real-time tracking systems.

SUMMARY

The present embodiments feature an angle-of-arrival (AOA) antenna system that uses two orthogonal arrays of patch antenna elements to measure the AOA of a wireless signal. Each antenna element has an antenna patch located over a corresponding ground patch. A shorting wall electrically connects one edge of the antenna patch to a corresponding edge of the underlying ground patch. The edge of the ground patch is also directly connected to a system ground plane. No other edges of the ground patch are connected to the system ground plane.

Advantageously, the shorting wall acts as an impedance that isolates the ground patch from the system ground plane over the bandwidth of the antenna. By comparison, prior-art AOA systems and antenna arrays typically use single-ended antenna elements that share a single ground. The shorting wall improves isolation between the antenna elements by preventing radio-frequency (RF) currents received at one antenna element from coupling into the output of other antenna elements. These cross-coupled currents may erroneously phase-shift the output of an antenna element, thereby acting as a source of systematic error. By improving isolation between antenna elements, this source of systematic error is reduced, and the present embodiments can generate AOA measurements with higher accuracy than prior-art AOA systems and antenna arrays that use single-ended antennas.

The patch antenna elements of the present embodiments are described herein as "quasi-balanced", meaning that each patch antenna element has properties similar to a fully balanced antenna, but can be driven like a single-ended antenna. To clarify, consider each patch antenna element in the absence of the shorting wall. Further assume that the antenna and ground patches have the same geometry. In this case, the antenna and ground patches have the same impedance, like a fully balanced antenna. With the ground patch connected to the system ground plane, the symmetry of the structure is broken, and it acts more like a single-ended antenna. The shorting wall, when included, modifies the electric field boundary conditions, thereby isolating the ground patch from the system ground plane. In fact, the shorting wall may be considered a balun that transforms the unmatched impedances of the system ground plane and a single-ended antenna feed into the balanced impedances of the antenna and ground patches. Since this "balun effect" is integral to the physical structure of the antenna element, it can be driven single-ended (i.e., with the single-ended antenna feed and system ground plane). No external balun, or other type of impedance transformer, is needed. Advantageously, the elimination of baluns reduces loss, component count, and size, as compared to prior-art AOA systems that require baluns.

The present embodiments include AOA antenna systems that use quasi-balanced patch antenna elements instead of single-ended patch antenna elements. Due to the structure of the quasi-balanced patch antennas, the present embodiments are immune to noise picked up by the system ground plane or other antenna elements. The determined AOA is also less sensitive to the polarization of the incoming wireless signal. A quasi-balanced patch antenna forces noise current to flow equally on the antenna and ground patches. This noise current is common-mode to the antenna element, and will be rejected by an output transmission line that is differentially connected to the antenna element.

Another advantage of the present embodiments is that the wireless signal can be received from the direction perpendicular to the plane of the array (i.e., broadside) or the direction parallel to the plane of the array (i.e., end-fire). By comparison, an array of single-ended patch antennas can only operate in the broadside configuration. Both of these advantages simplify how the present embodiments may be oriented.

In an embodiment, an AOA antenna system includes an array of first antenna elements along a first direction. Each of the first antenna elements has a first antenna patch positioned over a corresponding first ground patch. A first edge of the first antenna patch is parallel to the first direction, and a second edge of the first ground patch being is parallel to the first direction and electrically connected to the first edge. The AOA antenna system also includes an array of second antenna elements along a second direction orthogonal to the first direction. Each of the second antenna elements has a second antenna patch positioned over a corresponding second ground patch. A third edge of the second antenna patch is parallel to the second direction, and a fourth edge of the second ground patch is parallel to the second direction and electrically connected to the third edge. The AOA antenna system also includes a system ground plane having (i) a first ground-plane edge parallel to the first direction and directly electrically connected to each second edge, and (ii) a second ground-plane edge parallel to the second direction and directly electrically connected to each fourth edge.

BRIEF DESCRIPTION OF THE FIGURES

FIG. 1 shows the antenna element without an antenna patch while FIG. 2 shows the antenna element with the antenna patch.

DETAILED DESCRIPTION

Figure 1:
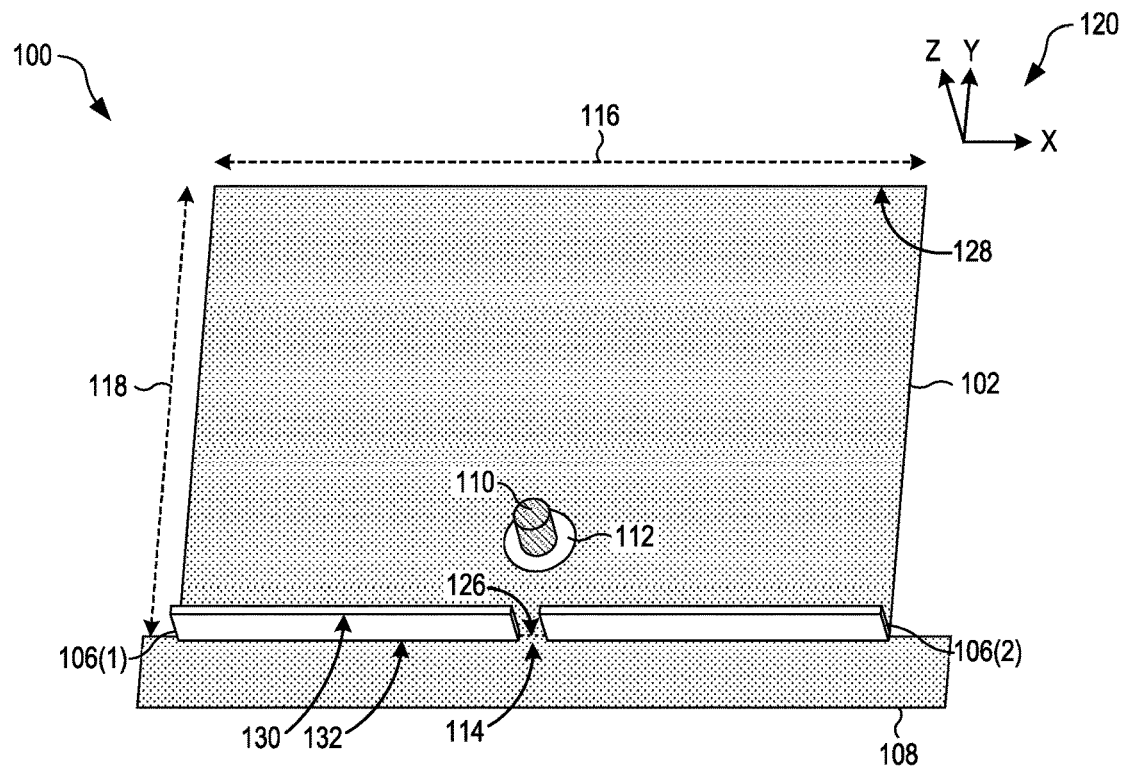
FIGS. 1 and 2 are perspective views of a patch antenna element, in an embodiment.
Figure 2:
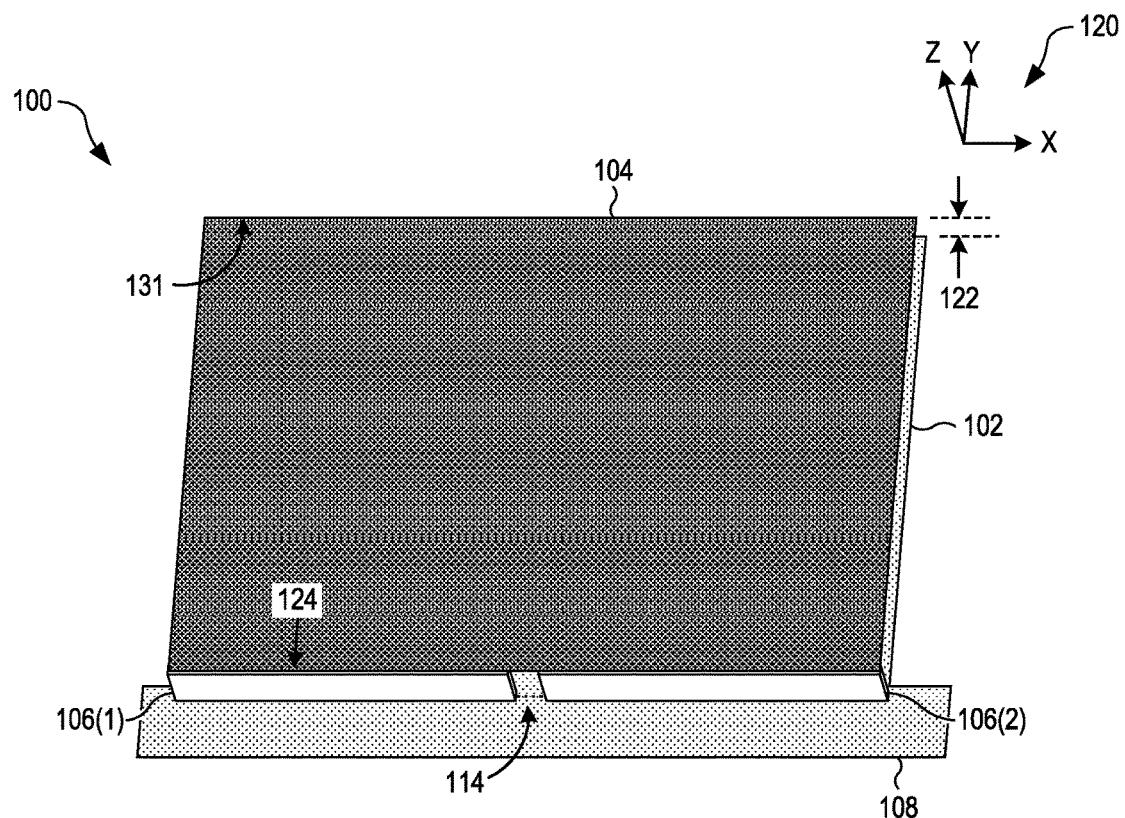

FIGS. 1 and 2 are perspective views of a quasi-balanced patch antenna element 100 that includes an antenna patch 104 located over a ground patch 102. FIG. 1 shows the antenna element 100 without the antenna patch 104, while FIG. 2 shows the antenna element 100 with the antenna patch 104. In FIGS. 1 and 2, the antenna patch 104 and ground patch 102 are shown as planar electrically conductive elements that lie flat in the x-y plane (see the right-handed coordinate system 120), and are therefore parallel to each other. The antenna patch 104 and ground patch 102 are also shown with the same length 116 in the x direction and the same width 118 in the y direction. The antenna patch 104 is located directly over the ground patch 102 in the z direction, i.e., each edge of the antenna patch 104 is located directly over, and oriented parallel to, a corresponding edge of the ground patch 102. The antenna patch 104 and ground patch 102 are separated in the z direction by a patch offset 122.

As shown in FIG. 2, the antenna patch 104 has a first edge 124 that is parallel to the x direction. The ground patch 102 has a corresponding second edge 126 that is parallel to the first edge 124, and is therefore also parallel to the x direction. The second edge 126 is directly electrically connected to a system ground plane 108 that is co-planar with the ground patch 102.

The first and second edges 124, 126 are electrically connected to each other to change the transmission/reception properties of the antenna element 100. In the example of FIGS. 1 and 2, the first and second edges 124, 126 are electrically connected via first and second shorting walls 106(1), 106(2) formed from an electrically conductive material (e.g., copper). Each of the shorting walls 106(1), 106(2) has opposed fifth and sixth edges 130, 132 lying parallel to the x direction. The fifth edge 130 is directly electrically connected to the first edge 124, and the sixth edge 132 is directly electrically connected to the second edge 126. Here, "directly" means without any intervening component or conductor (with the possible exception of solder, electrically conductive epoxy, or a similar material used to ensure electrical contact between the first and fifth edges 124, 130, and between the second and sixth edges 126, 132).

Figure 15:
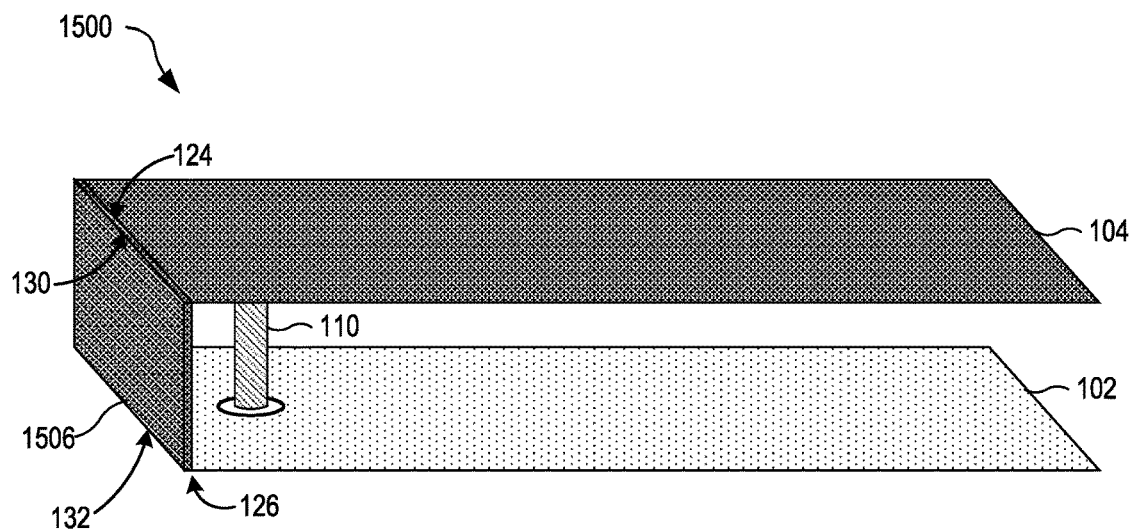
FIG. 15 shows an antenna element that includes only one shorting wall with no gap, in an embodiment.

The antenna patch 104 is electrically connected to an antenna feed 110 that includes a via surrounded by an electrically non-conductive ring 112. The antenna feed 110 may include a transmission line running underneath the ground patch 102 and system ground plane 108 (see transmission lines 1010 in FIG. 10). The transmission line may run underneath a gap 114 formed between the shorting walls 106(1) and 106(2). As described in more detail below, the gap 114 provides a space for the transmission line to pass, along an electrically conductive layer of a circuit board underneath the ground patch 102 and system ground plane 108, when the shorting walls 106(1) and 106(2) pass through all layers of the circuit board. When the gap 114 is included, its width in the x direction may be small compared to a design wavelength of the antenna element 100, thereby ensuring that it has negligible impact on the performance of the antenna element 100 (as compared to the case where there is only one shorting wall 106 extending along the entire length of the edges 124 and 126, as shown in FIG. 15).

Figure 3:
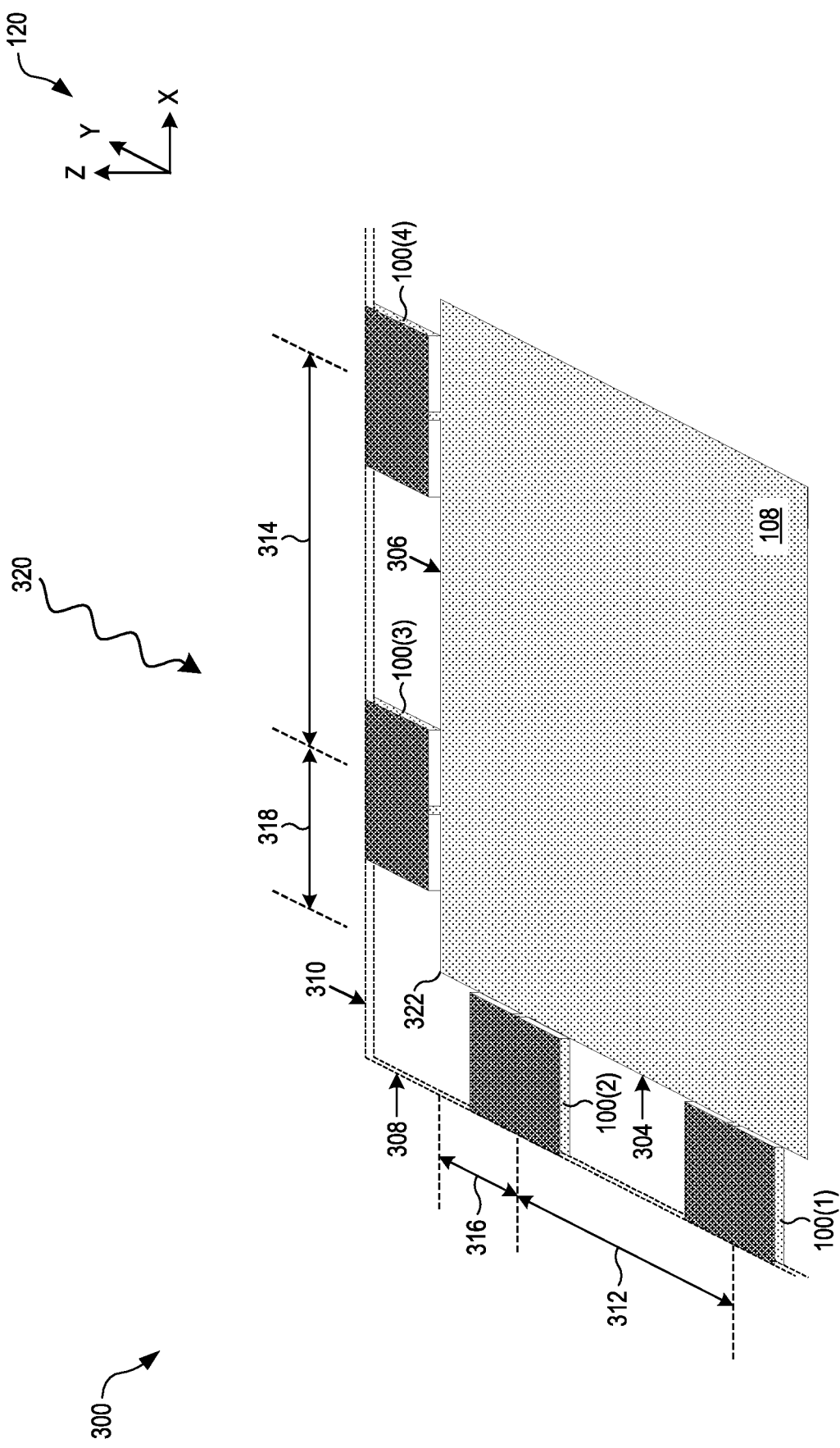
FIG. 3 shows an angle-of-arrival (AOA) antenna array that uses four of the antenna element of FIGS. 1 and 2 to measure an AOA of a wireless signal, in an embodiment.

FIG. 3 shows an angle-of-arrival (AOA) antenna array 300 that uses four of the quasi-balanced patch antenna element 100 of FIGS. 1 and 2 to measure an AOA of a wireless signal 320. The AOA antenna array 300 includes a first linear array of antenna elements 100 spaced along a first direction, and a second linear array of antenna elements 100 spaced along a second direction that is perpendicular to the first direction. In the example of FIG. 3, the first direction is the y direction, and the second direction is the x direction. The first linear array includes first and second antenna elements 100(1), 100(2) spaced by a first spacing 312, and the second linear array includes third and fourth antenna elements 100(3), 100(4) spaced by a second spacing 314. While FIG. 3 shows each of the first and second linear arrays with two antenna elements 100, one or both of the first and second linear arrays may include more than two antenna elements 100 without departing from the scope hereof. For example, the first and second linear arrays may each have three antenna elements 100.

In FIG. 3, the first and second spacings 312, 314 are measured between phase centers of neighboring antenna elements 100. To avoid π ambiguities, each of the first and second spacings 312, 314 should be less than one-half of the free-space wavelength λ of the wireless signal 320 (i.e., λ/2). For example, if the wireless signal 320 has a frequency of 2.45 GHz, each of the first and second spacings 312, 314 should be less than approximately 61.2 mm. In one embodiment, the first and second spacings 312, 314 are equal. In embodiments where the first linear array contains more than two antenna elements 100, the first spacing 312 may be uniform, i.e., the same for each pair of neighboring antenna elements 100. Alternatively, the first spacing 312 may be non-uniform. Similarly, the second spacing 314 may be uniform or non-uniform when the second linear array contains more than two antenna elements 100.

The system ground plane 108 has a first ground-plane edge 304 parallel to the first direction, and a second ground-plane edge 306 parallel to the second direction. The ground-plane edges 304, 306 meet at a corner 322. For each antenna element 100 of the first linear array, the second edge 126 is directly electrically connected to the first ground-plane edge 304. Similarly, for each antenna element 100 of the second linear array, the second edge 126 is directly electrically connected to the second ground-plane edge 306. Thus, in FIG. 3, the second edge 126 of the first and second antenna elements 100(1), 100(2) is directly electrically connected to the first ground-plane edge 304 and the second edge 126 of the third and fourth antenna elements 100(3), 100(4) is directly electrically connected to the second ground-plane edge 306. However, when one or both of the first and second linear arrays includes more than two antenna elements 100, the first and second ground-plane edges 304, 306 may be extended accordingly so that all antenna elements 100 are similarly connected to the system ground plane 108.

Since the ground-plane edges 304, 306 serve as boundaries for the system ground plane 108 in the x-y plane, the system ground plane 108 does not extend into the region directly between the first and second antenna elements 100(1), 100(2), or the region directly between the third and fourth antenna elements 100(3), 100(4). Equivalently, each ground patch 102 is directly electrically connected to the system ground plane 108 only along the second edge 126, i.e., all other edges of the ground patch 102 are not directly electrically connected to the system ground plane 108. This geometry increases isolation between the first and second antenna elements 100(1), 100(2), and between the third and fourth antenna elements 100(3), 100(4).

The phase center of the second antenna element 100(2) is offset from the corner 322 along the first direction by a first offset 316, and the phase center of the third antenna element 100(3) is offset from the corner 322 along the second direction by a second offset 318. The offsets 316, 318 may be selected to increase isolation between the second and third antenna elements 100(2), 100(3). For example, the offsets 316, 318 may be selected such that the two-dimensional distance, in the x-y plane, between the phase centers of the antenna elements 100(2), 100(3) is approximately λ/2. In the example of FIG. 3, the first offset 316 is a fraction of the first spacing 312, and the second offset 318 is a fraction of the second spacing 314. In some embodiments, the first offset 316 is one-half of the first spacing 312, and the second offset 318 is one-half of the second spacing 314. In some embodiments, the first offset 316 and second offset 318 are equal.

FIG. 3 also shows how the antenna elements 100(1), 100(2) of the first linear array can be fabricated on a printed circuit board (PCB) up to a first board edge 308, and how the antenna elements 100(3), 100(4) of the second linear array can be fabricated on the PCB up to a second board edge 310. Specifically, each antenna patch 104 has an edge 131 opposite to the first edge 124, and each ground patch 102 has an edge 128 opposite to the second edge 126. The edges 128, 131 of the first and second antenna elements 100(1), 100(2) may be aligned with the first board edge 308, while the edges 128, 131 of the third and fourth antenna elements 100(3), 100(4) may be aligned with the second board edge 310. In some embodiments, the edges 128, 131 are not aligned with the board edges 308, 310. For example, the edges 128, 131 may be offset from the board edges 308, 310 with dielectric material.

Figure 4:
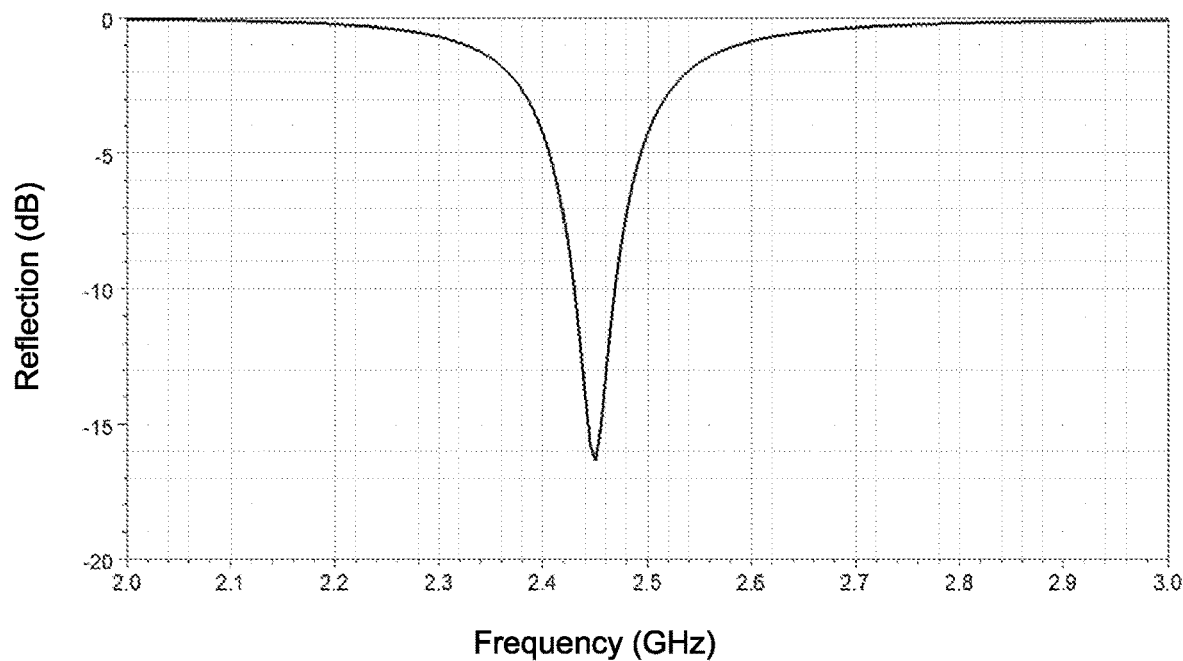
FIG. 4 is a plot of reflection versus frequency for all four of the antenna elements shown in FIG. 3.
Figure 5:
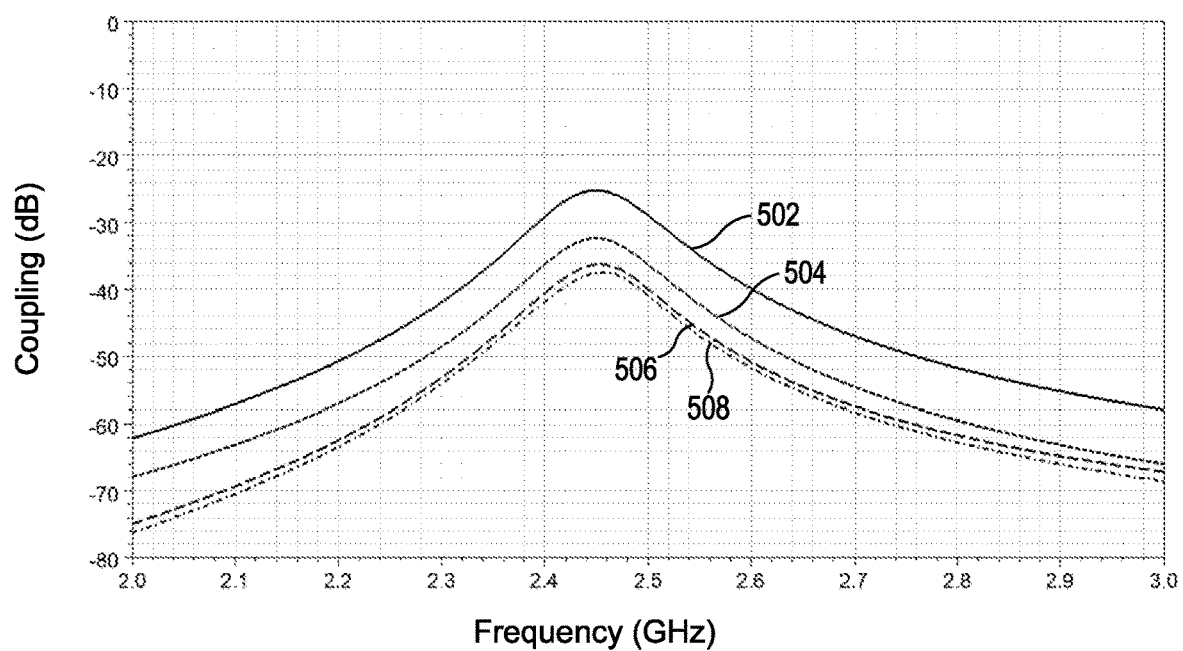
FIG. 5 is a plot of cross-coupling versus frequency for all pairs of the antenna elements shown in FIG. 3.
Figure 6:
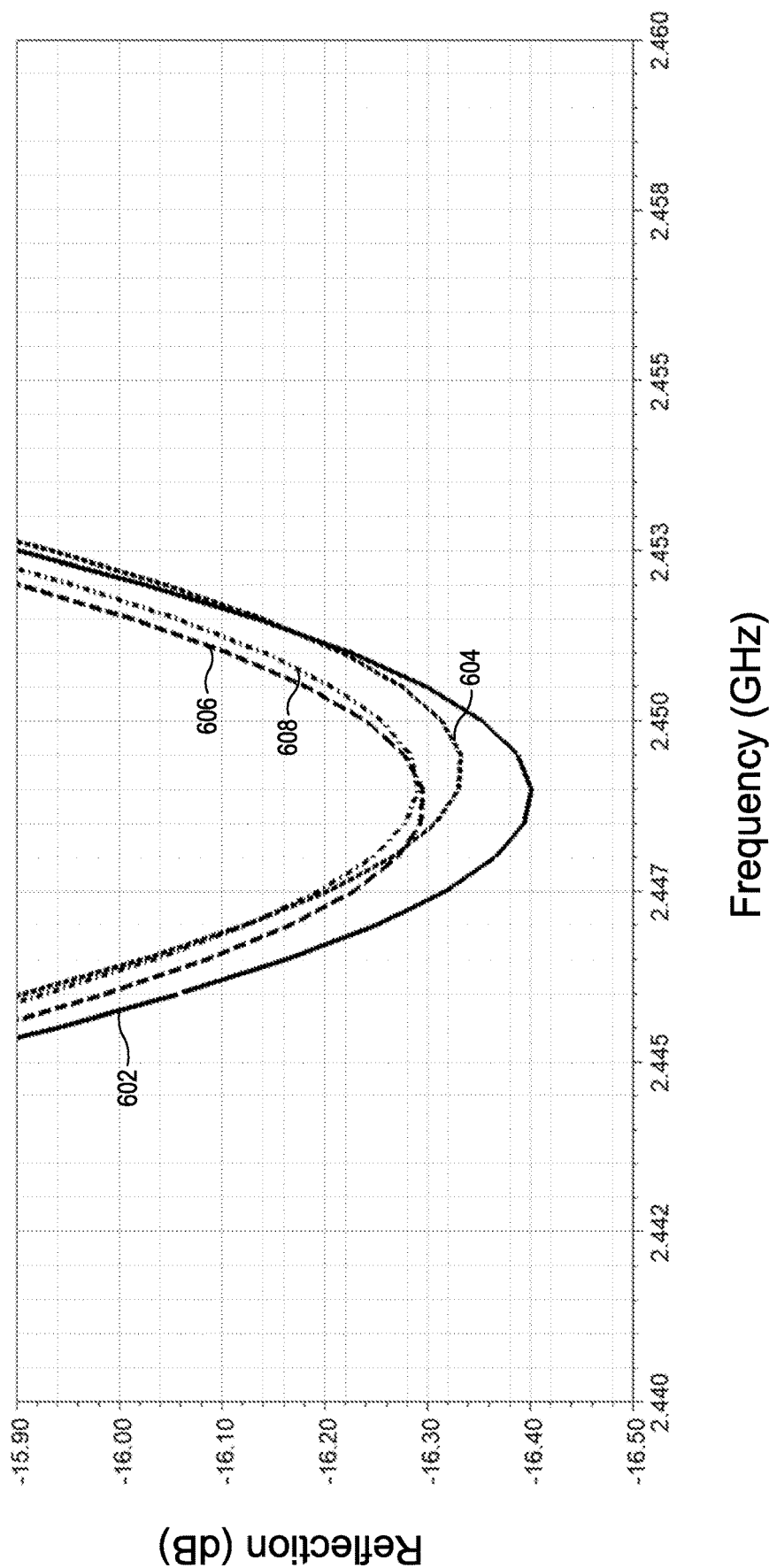
FIG. 6 shows the plot of FIG. 4, but magnified.

FIGS. 4-6 show simulated behavior of the AOA antenna array 300 of FIG. 3. Specifically, FIG. 4 is a plot of reflection coefficients versus frequency for all four of the quasi-balanced patch antenna elements 100(1), 100(2), 100(3), 100(4). FIG. 5 is a plot of cross-coupling coefficients versus frequency for all pairs of the quasi-balanced patch antenna elements 100(1), 100(2), 100(3), 100(4). FIG. 6 shows the plot of FIG. 4, but magnified near the resonant frequency to distinguish between the curves of the four quasi-balanced patch antenna elements 100(1), 100(2), 100(3), 100(4). FIGS. 4-6 are best viewed together with the following description.

The data in FIGS. 4-6 was obtained by numerically simulating the AOA antenna array 300 assuming that all four antenna elements 100(1), 100(2), 100(3), 100(4) have the same geometry. Specifically, the length 116 of each antenna element 100 was set to 20.00 mm, and the width 118 of each antenna element 100 was set to 14.91 mm. The distance in the x-y plane between each antenna feed 110 and the corresponding second edge 126 was set to approximately 3.37 mm. The antenna patches 104, ground patches 102, and system ground plane 108 were assumed to be formed with one-ounce copper on a PCB that has FR-4 as the dielectric material. It was also assumed that FR-4 was located between each antenna patch 104 and its corresponding ground patch 102. The spacings 312, 314 were each set equal to 49.5 mm, and the offsets 316, 318 were each set equal to 25 mm.

The AOA antenna array 300 was numerically modelled in terms of a 4×4 scattering matrix of complex, frequency-dependent S-parameters $S_{ij}$, where i and j index the four antenna elements 100(1), 100(2), 100(3), 100(4). For each antenna element 100(i), a reflection coefficient was calculated from the magnitude of the diagonal element $S_{ii}$ at several frequencies. For each pair of antenna elements 100(i) and 100(j), where i≠j, a cross-coupling coefficient was calculated from the magnitude of the off-diagonal element $S_{ij}$, also at several frequencies.

FIG. 4 shows the reflection coefficients of the four antenna elements 100(i) for a span of 1 GHz and a frequency spacing of 1 MHz. The reflection coefficients are represented by four corresponding curves that are too similar to be resolved at these scales. Each antenna element 100(i) has a resonance near 2.45 GHz, i.e., the center of the ISM band spanning 2.4-2.5 GHz. On resonance, each antenna element 100(i) has a reflection coefficient of approximately −16.5 dB. The full width of each resonance is approximately 40 MHz, as measured at the −10 dB points.

FIG. 5 shows the cross-coupling coefficients of the four antenna elements 100(i) for the same frequency range as FIG. 4. A solid curve 502 indicates the cross-coupling coefficient for the second and third antenna elements 100(2), 100(3) (i.e., the magnitude of the S-parameter $S_{23}$). A short-dashed curve 504 indicates the cross-coupling coefficient for the first and second antenna elements 100(1), 100(2). Due to symmetry, the curve 504 also indicates the cross-coupling coefficient for the third and fourth antenna elements 100(3), 100(4). A long-dashed curve 506 indicates the cross-coupling coefficient for the first and third antenna elements 100(1), 100(3). Due to symmetry, the curve 506 also indicates the cross-coupling coefficient for the second and fourth antenna elements 100(2), 100(4). A dashed-dotted curve 508 indicates the cross-coupling coefficient for the first and fourth antenna elements 100(1), 100(4).

From FIG. 5, the two antenna elements 100 closest to the corner 322 (i.e., the second and third antenna elements 100(2) and 100(3)) exhibit the greatest cross-coupling. Advantageously, the cross-coupling coefficient is no greater than approximately −25 dB. Cross-coupling between the pair of antenna elements 100 within each linear array (e.g., the antenna elements 100(1) and 100(2)) is suppressed when the pair of antenna elements 100 is spaced by λ/2 between phase centers. With this spacing, each antenna element 100 of the linear array is located in the null of the radiation pattern of its immediate neighbor antenna elements 100, which advantageously reduces cross-coupling. However, as described above, the spacing between phase centers should be less than λ/2 to avoid π ambiguities. Therefore, in the numerical simulation, the value of 49.5 mm selected for the first and second spacings 312, 314 is less than λ/2=61.2 mm at 2.45 GHz. Due to this value of the first and second spacings 312, 314, there is some cross-coupling between neighboring antenna elements 100. For the curves 506 and 508, the increased distance between a pair of antenna elements 100, one located in the first linear array and the other located in the second linear array, further reduces cross-coupling.

FIG. 6 illustrates an alternative way to quantify the impact of cross-coupling on the performance of the antenna elements 100. If there was no cross-coupling between any pair of antenna elements 100 (i.e., $S_{ij}$=0 for all off-diagonal elements), the four curves in FIG. 4 would be identical. However, cross-coupling impacts the antenna elements 100 by distorting and shifting the resonances. This effect can be seen in FIG. 6, where curves 602, 604, 606, and 608 are the reflection coefficients for the antenna elements 100(1), 100(2), 100(3), and 100(4), respectively. The curves 602, 604, 606, and 608 have minima differing in frequency by up to 2 MHz, and differing in reflection coefficient by up to 0.1 dB. Such small shifts are a direct result of the improved isolation between the antenna elements 100 attained by the shorting walls 106.

Figure 7:
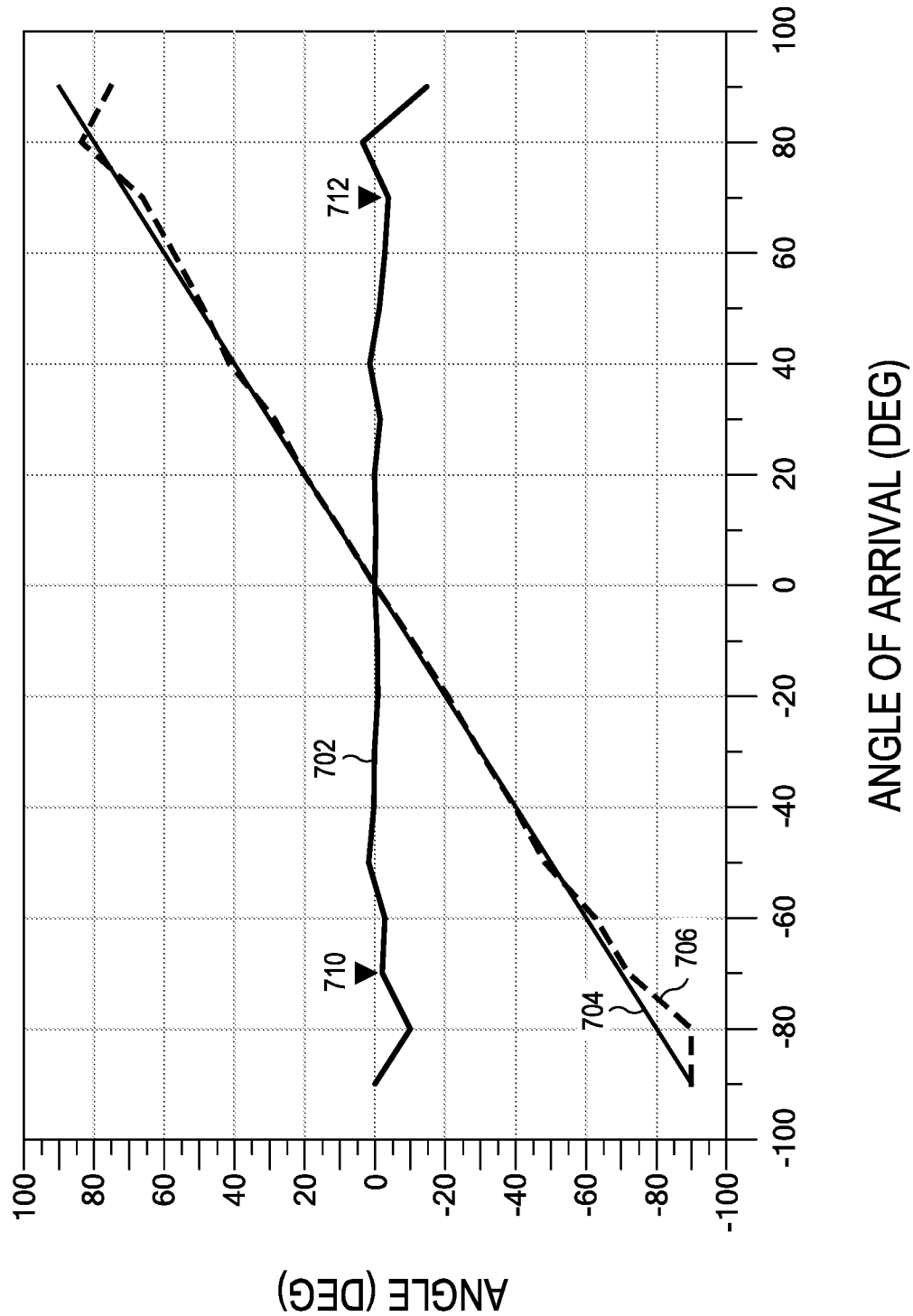
FIG. 7 is a plot of a simulated transfer function for the AOA antenna array of FIG. 3.

FIG. 7 is a plot of a simulated transfer function for the AOA antenna array 300. Simulated data points 706, shown in FIG. 7 as being joined by a dashed line, were calculated for AOAs between −90° and +90°, in steps of 10°. The data points 706 were calculated using the same geometry and assumptions as for FIGS. 4-6. In addition, the antenna array 300 had the orientation shown in FIG. 3. The frequency of the wireless signal 320 was set to 2.45 GHz. Furthermore, the wireless signal 320 was assumed to propagate in the −y direction such that it was received by the sides of the antenna elements 100(3), 100(4) opposite to the shorting wall 106. It was further assumed that the wireless signal 320 was linearly polarized along the z direction. The AOA is the angle, in the x-y plane, between the first direction and the y direction of the AOA antenna array 300 (i.e., the propagation direction of the wireless signal 320 was fixed while the AOA antenna array 303 rotated). Thus, in FIG. 3, where the first direction is the y direction, the antenna array 300 is orientated at an AOA of 0°.

In FIG. 7, the straight line 704 represents an ideal linear response, while residuals 702 are equal to the difference between the simulated data points 706 and the straight line 704. A marker 710 at −70° shows an error of −2.033°, and a marker 712 at +70° shows an error of −3.77°. Simulations at other frequencies (e.g., 2.4 GHz and 2.5 GHz) and polarization (e.g., 450 and 700 relative to the z axis) show similar results.

Figure 8:
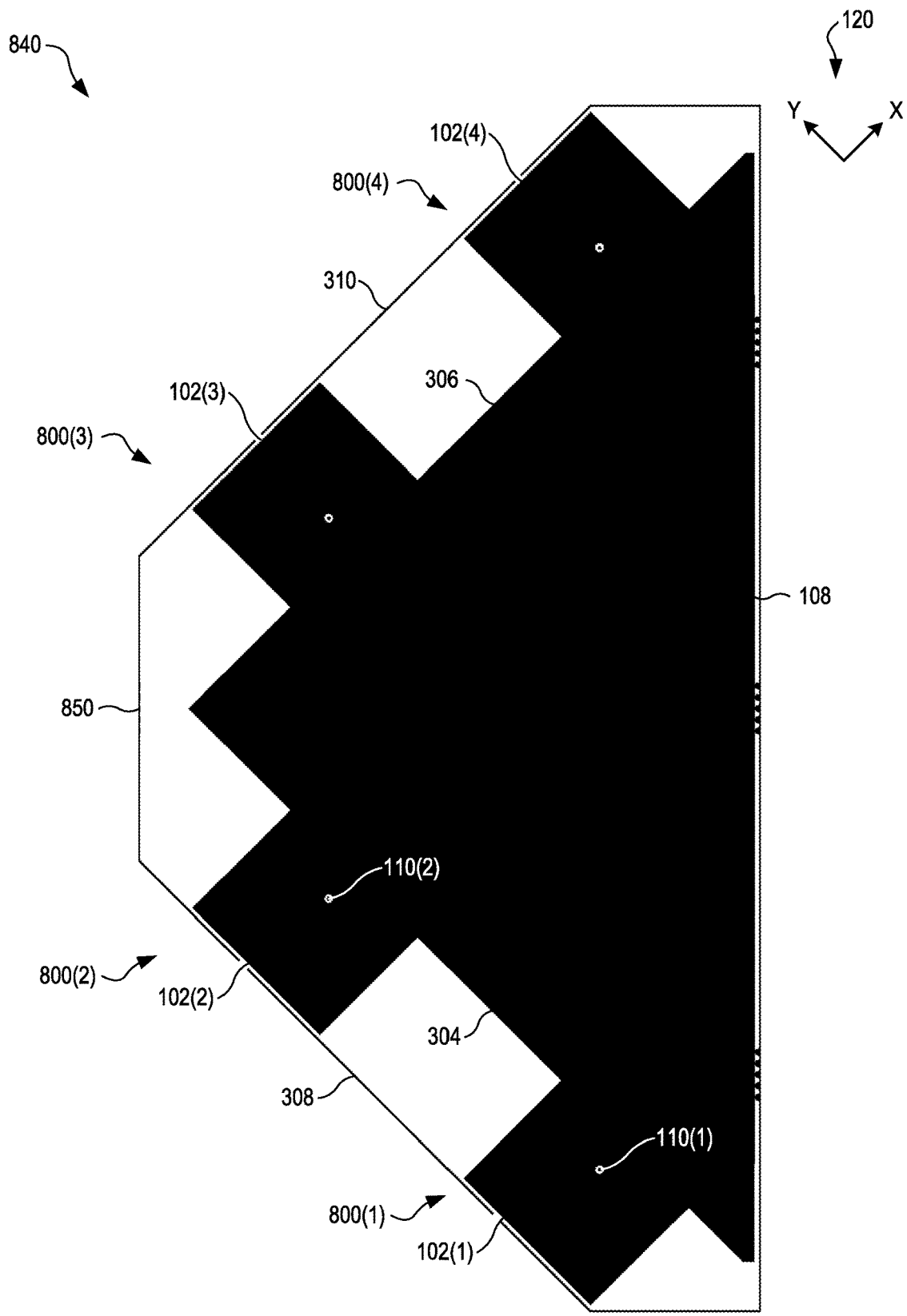
FIG. 8 shows a middle layer of a printed circuit board (PCB) that implements the AOA antenna array of FIG. 3, in an embodiment.
Figure 9:
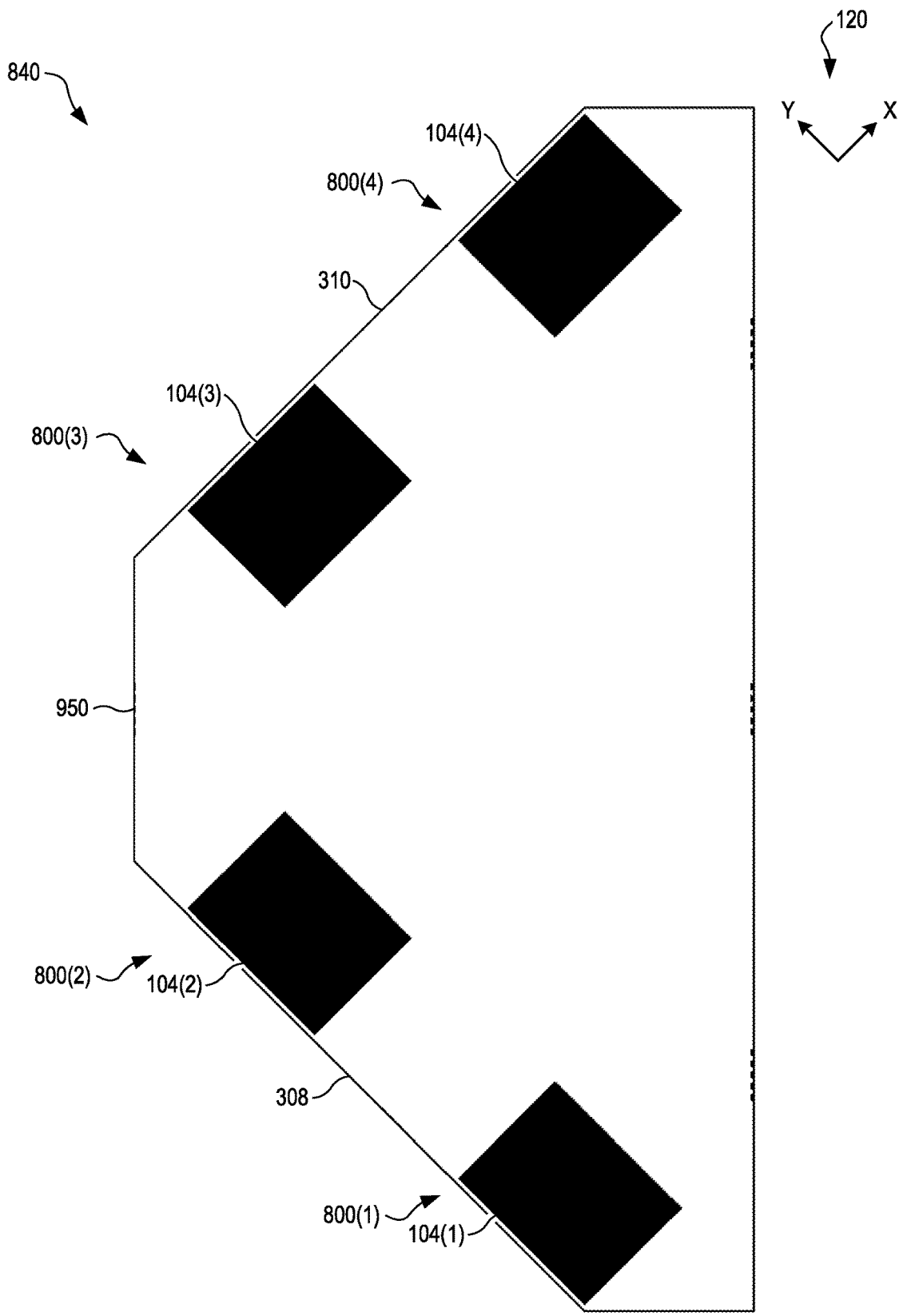
FIG. 9 shows a top layer of the PCB of FIG. 8, in an embodiment.
Figure 10:
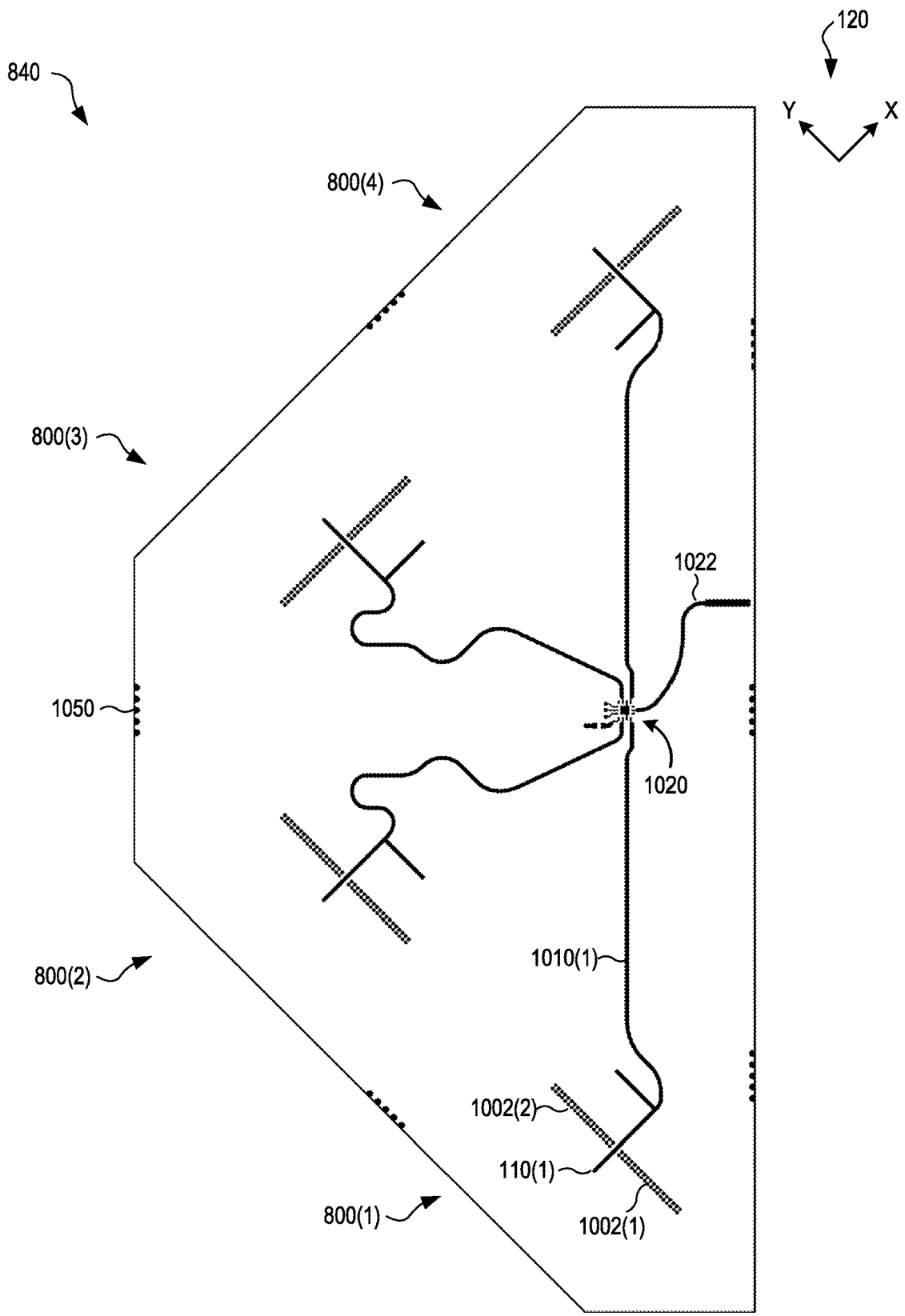
FIG. 10 shows a bottom layer of the PCB of FIG. 8, in an embodiment.
Figure 11:
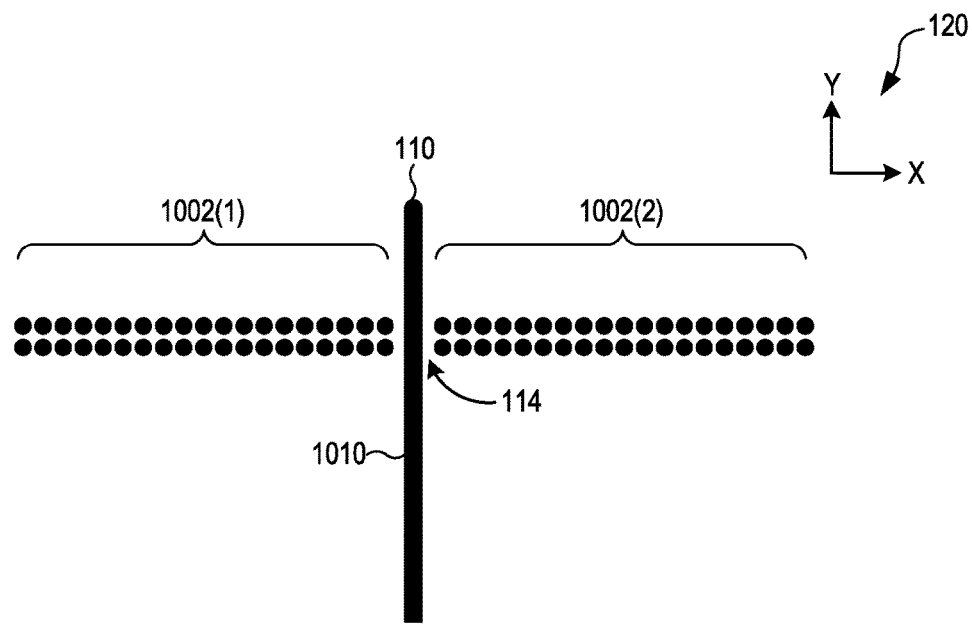
FIG. 11 shows the first and second via arrays, in an embodiment.

FIGS. 8-10 show a middle layer 850, top layer 950, and bottom layer 1050, respectively, of a PCB 840 that implements the AOA antenna array 300 of FIG. 3. The PCB 840 includes four quasi-balanced patch antenna elements 800(1), 800(2), 800(3), 800(4) that are similar to the four quasi-balanced patch antenna elements 100(1), 100(2), 100(3), 100(4) of FIGS. 1-3 except that each quasi-balanced patch antenna element 800 uses first and second via arrays 1002 (1), 1002(2) as the first and second shorting walls 106(1), 106(2). FIG. 11 shows the first and second via arrays 1002(1), 1002(2) in more detail. The PCB 840 is shown in FIGS. 8-10 with a geometry similar to that used to generate the plots of FIGS. 4-7. FIGS. 8-11 are best viewed together with the following description.

In the middle layer 850, the system ground plane 108 and the four ground patches 102(1), 102(2), 102(3), 102(4) form one continuous planar piece of metal. Shown in black in FIG. 8, this one continuous planar piece of metal may be one-ounce copper, two-ounce copper, nickel-plated copper, gold-plated copper, or another type of metal commonly used for PCB fabrication. In FIG. 8, the system ground plane 108 is shaped as a right triangle, an example geometry that different from the rectangular shape shown in FIG. 3. The system ground plane 108 may be alternatively shaped without departing from the scope hereof.

In the top layer 950, each antenna patch 104 is located directly over a corresponding ground patch 102. In the bottom layer 1050, a switch 1020 has four inputs, each connected to a corresponding transmission line 1010. An output 1022 of the switch 1020 transmits an electrical signal received from one of the four antenna elements 800 to an additional circuit for signal processing (not shown). Each transmission line 1010 also connects to the antenna feed 110 for its corresponding antenna element 800.

Each via array 1002(1), 1002(2) has two rows of plated through-holes that pass through all layers of the PCB 840. Thus, it should be understood that the via arrays 1002(1), 1002(2) also pass through the middle layer 850 and top layer 950 even though they are not visible in FIGS. 8 and 9. The through-holes may be additionally filled with solder, or another electrically conductive material, to enhance electrical contact between each antenna patch 104 and its corresponding ground patch 102.

FIG. 11 shows how the via arrays 1002(1), 1002(2) form the gap 114 through which the transmission line 1010 passes to reach the antenna feed 110. Each via array 1002(1), 1002(2) is shown as two parallel rows of 19 vias. However, each via array 1002(1), 1002(2) may have only row, or more than two rows, without departing from the scope hereof. Similarly, each row may have more than 19 vias, or less than 19 vias, without departing from the scope hereof. The diameter of the each via may be larger or smaller than shown in FIG. 11 without departing from the scope hereof. The vias may be plated so that they electrically connect to their neighbors on the top and/or bottom layers of the PCB 840.

Advantageously, the via arrays 1002(1), 1002(2) implement the first and second shorting walls 106(1), 106(2) using circuit-board fabrication techniques known in the art. For example, each transmission line 1010 can be implemented as microstrip, wherein the width of the transmission line 1010 is selected such that it has a characteristic impedance matching that of the antenna element 800 to which it connects. Each transmission line 1010 may alternatively be implemented using another type of planar microwave transmission line (e.g., coplanar waveguide, stripline, slotline, etc.). Metallic traces, including the transmission line 1010 and the metal used to plate the through-holes of the via arrays 1002(1) and 1002(2), are typically copper. However, other metals may be used (e.g., nickel, silver, tin), or a combination thereof.

Figure 12:
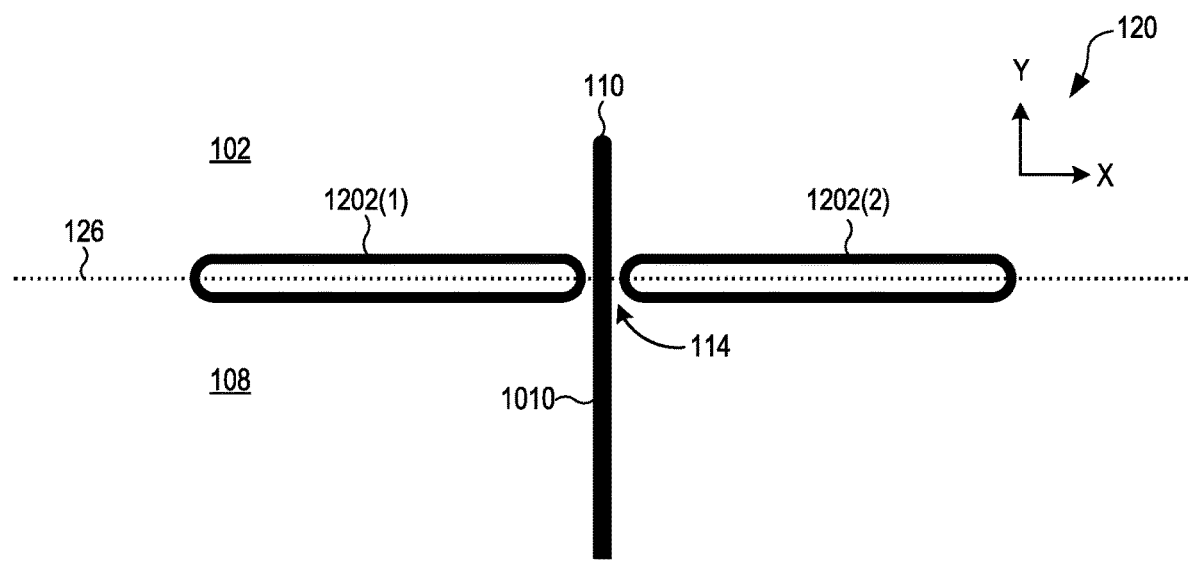
FIG. 12 shows how each antenna element may use slot vias as shorting walls, in an embodiment.

FIG. 12 shows how each quasi-balanced patch antenna element 800 uses first and second slot vias 1202(1), 1202(2) as the first and second shorting walls 106(1), 106(2). The slot vias 1202(1), 1202(2) can also be produced using circuit board fabrication techniques known in the art. For example, each slot via 1202 can be fabricated by milling a linear through-hole, or slot, along the x direction and through all the layers of the circuit board. Each machined slot can then be plated with metal to electrically short the antenna patch 104 with its corresponding ground patch 102. Similar to the plated through-holes in FIG. 10, the slot vias 1202(1), 1202(2) may be filled with solder, or another electrically conductive material, to enhance electrical contact.

Figure 13:
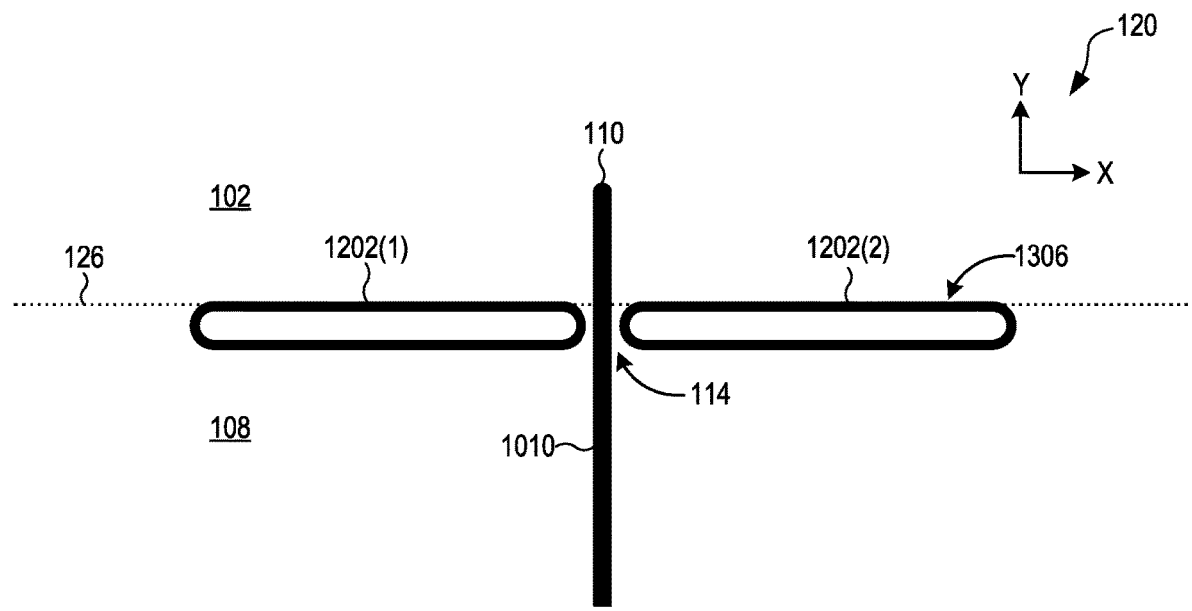
FIG. 13 shows how the slot vias of FIG. 12 may be translated such that a first lengthwise edge of each slot via coincides with a second edge of each antenna element, in an embodiment.
Figure 14:
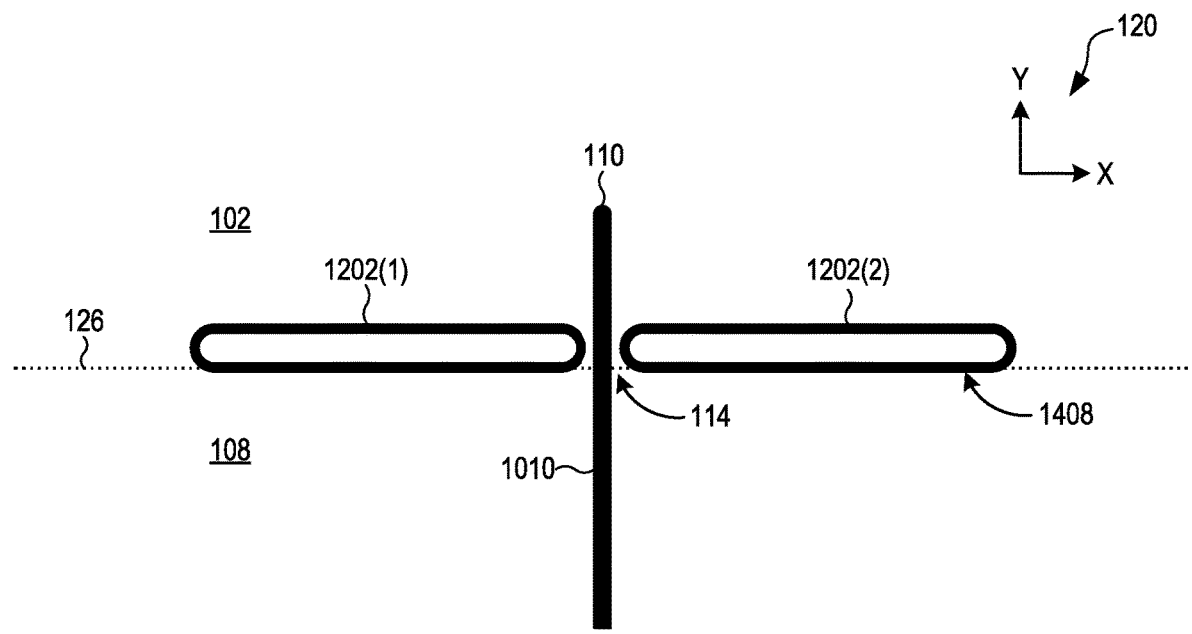
FIG. 14 shows how the slot vias of FIG. 12 may be translated such that a second lengthwise edge of each slot via coincides with the second edge of each antenna element, in an embodiment.

FIGS. 12-14 show how the slot vias 1202(1), 1202(2) can be located with respect to the second edge 126 that defines the boundary between the system ground plane 108 and ground patch 102. In FIG. 12, the second edge 126 passes along the mid-line of each slot via 1202 such that a first half of each slot via 1202 overlaps the system ground plane 108, and a second half overlaps the ground patch 102. However, the slot vias 1202(1), 1202(2) may be translated so that their midlines do not coincide with the second edge 126. For example, in FIG. 13, the slot vias 1202(1), 1202(2) have been translated in the −y direction such that a first lengthwise edge 1306 of each slot via 1202 coincides with the second edge 126. In this case, each slot via 1202 entirely overlaps the system ground plane 108. In FIG. 14, the slot vias 1202(1), 1202(2) have been translated in the +y direction such that a second lengthwise edge 1408 of each slot via 1202 coincides with the second edge 126. In this case, each slot via 1202 entirely overlaps the ground patch 102. The slot vias 1202(1), 1202(2) may be translated along the y direction by a different amount than shown in FIGS. 12-14 without departing from the scope hereof. Furthermore, the translations depicted in FIGS. 12-14 apply to the via arrays 1002(1), 1002(2) of FIGS. 10 and 11. Thus, it is not necessary that each via array 1002 be positioned such that the second edge 126 runs between the two rows of vias.

In the embodiments of FIGS. 8-14, one or more non-electrically-conductive layers of the PCB 840 are partially located between each antenna patch 104 and its ground patch 102. These layers are formed from a dielectric material that affect the properties of each antenna element 800. Accordingly, the PCB 840 may be constructed with a dielectric material having low loss (e.g., loss tangent) over the bandwidth of the antenna elements 800. Examples of such a dielectric material include PTFE, ceramic, polyimide, Rogers R04000 series laminates, AGC-Nelco Meteorwave 8000 series laminates, G10, and others. FR-4 may also be used.

Figure 16:
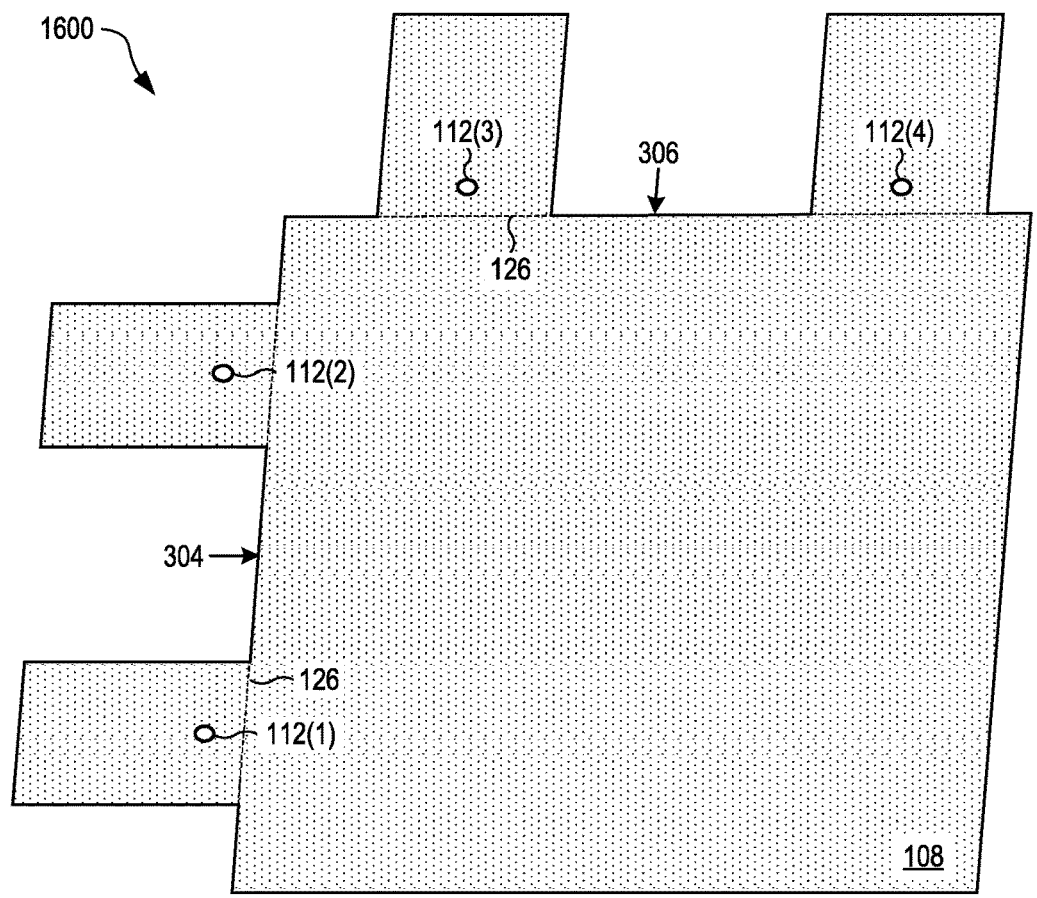
FIG. 16 shows a PCB to which the antenna element of FIG. 15 may be soldered, in an embodiment.
Figure 17:
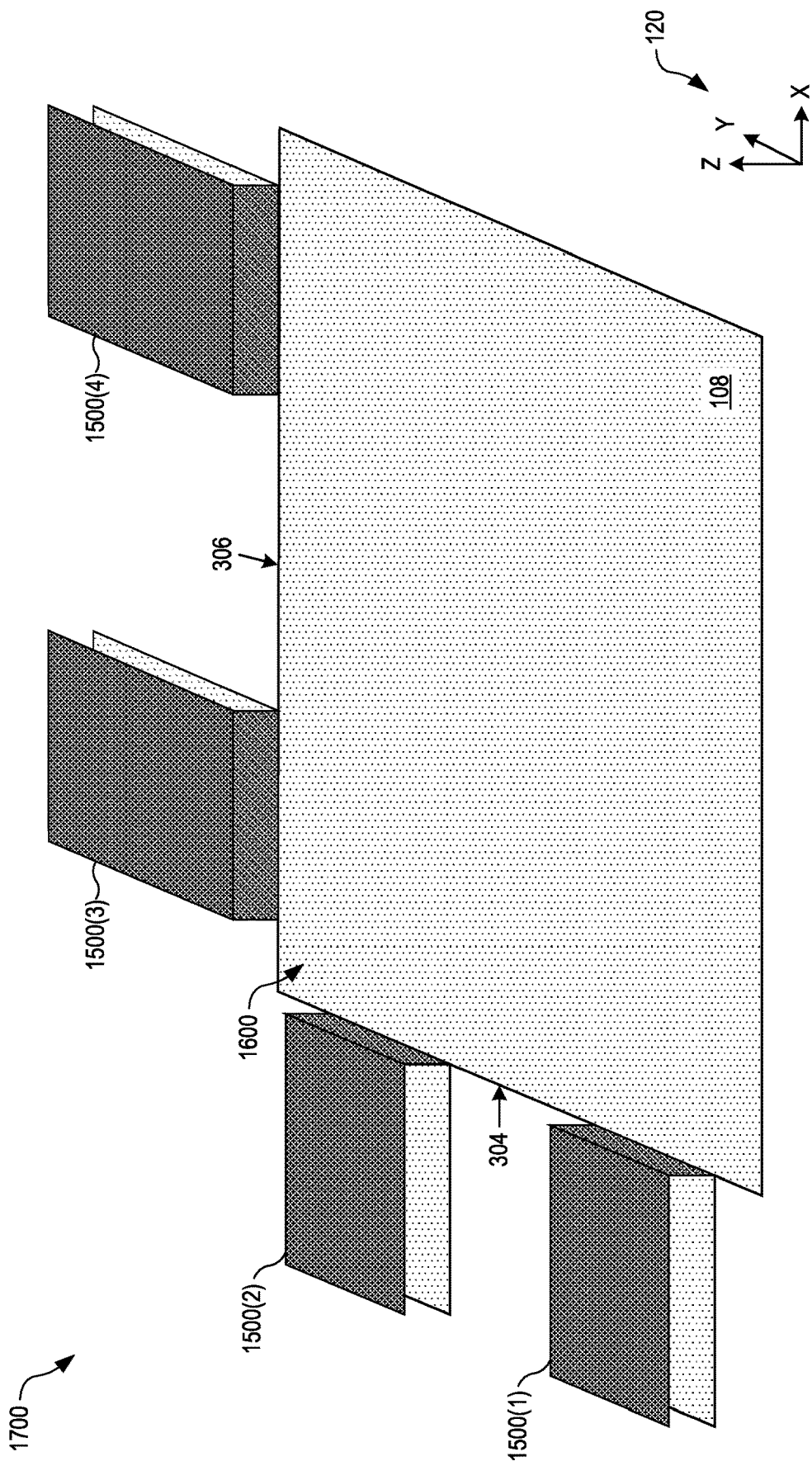
FIG. 17 shows an AOA antenna array that uses four of the antenna elements of FIG. 15 with the PCB of FIG. 16, in an embodiment

FIGS. 15-17 show an AOA antenna array 1700 that is similar to the AOA antenna array 300 of FIG. 3 except that it uses four gap-free quasi-balanced patch antenna elements 1500. Here, "gap-free" means that each antenna element 1500 includes only one shorting wall 1506 and no gap 114. Each antenna element 1500 may be formed, for example, by bending a metal sheet to form the antenna patch 104 and shorting wall 1506. The first edge 124 and fifth edge 130 occur where this metal sheet is bent. The sixth edge 132 may then be directly soldered or epoxied to the metallic top layer of a PCB 1600 at the corresponding second edge 126. FIG. 16 shows the metallic top layer, of the PCB 1600, forming the ground patches 102 and system ground plane 108. The antenna feed 110 may pass through the ring 112 to solder to the antenna patch 104.

As compared to the AOA antenna array 300, the AOA antenna array 1700 does not require through-holes passing through all layers of the PCB 1600. Thus, the AOA antenna array 1700 does not use via arrays 1002 or slot vias 1202 to electrically connect each antenna patch 104 with its ground patch 102. Without via arrays 1002 and slot vias 1202, a transmission line 1010 is no longer constrained to pass directly underneath the gap 114, which provides more freedom for designing and routing the transmission lines 1010 on the PCB 1600.

Another advantage of the AOA antenna array 1700 is that the PCB 1600 can be a two-layer board (i.e., with no internal layers) provided that all of the transmission lines 1010 are routed on the bottom layer of the PCB 1600. A two-layer board is less expensive and easier to fabricate than a board with more than two layers (e.g., the PCB 840 of FIGS. 7-9, which requires at least three layers).

Another advantage of the AOA antenna array 1700 is that it can be used to fabricate antenna elements 1500 whose patch offset 122 cannot be achieved using a multi-layer circuit board. Most two-layer circuit boards have a thickness of 1.57 mm (0.063"), while most four-layer circuit boards have a thickness of 3.18 mm (0.13"). Even thicker circuit boards can be obtained by increasing the number of layers, which also increases cost and complexity. For a patch offset 122 of several millimeters, for example, the antenna elements 1500 may be easier to fabricate than the antenna elements 800.

Another advantage of the AOA antenna array 1700 is that it can be constructed using air as the dielectric medium within each antenna element 1500 (i.e., directly between each antenna patch 104 and corresponding ground patch 102), advantageously reducing loss compared to a solid dielectric medium. Alternatively, a solid dielectric medium different from those typically used for PCBs can be used, such as crystalline silicon, sapphire, and glass. As compared to air, a solid dielectric medium located within an antenna element 1500 can improve its mechanical rigidity, thereby making the AOA antenna array 1700 more robust for field-deployable operation.

Figure 18:
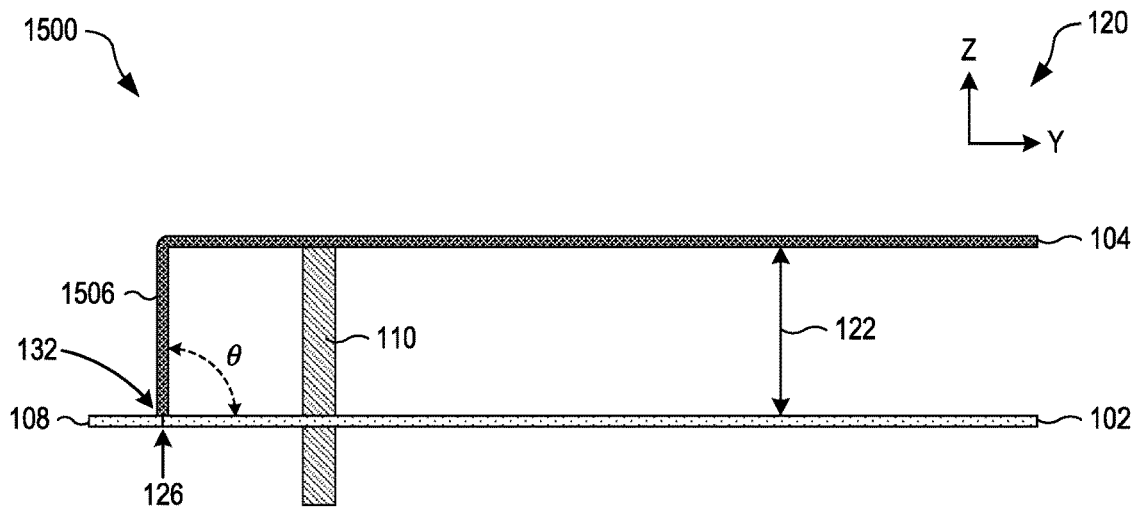
FIG. 18 shows how the antenna element of FIG. 15 may form a right angle relative to the ground patch, in an embodiment.
Figure 19:
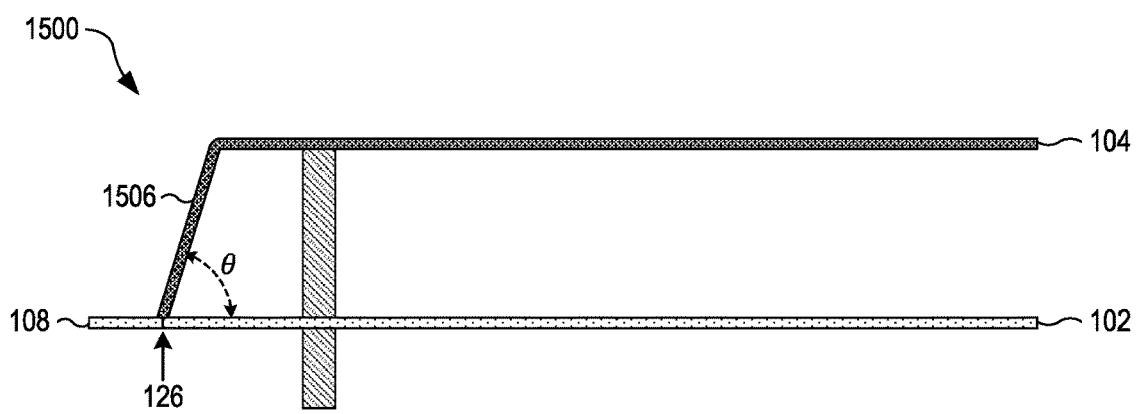
FIG. 19 shows how the antenna element of FIG. 15 may form an acute angle relative to the ground patch, in an embodiment.
Figure 20:
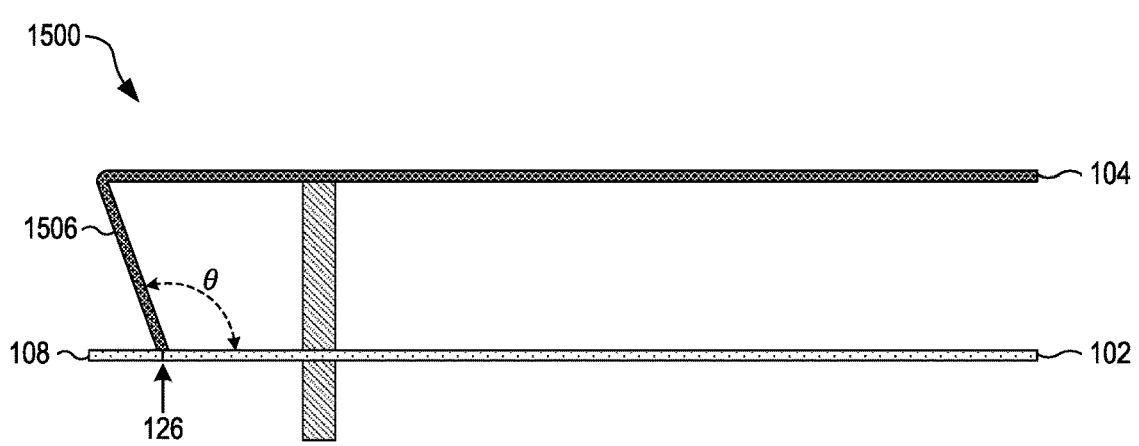
FIG. 20 shows how the antenna element of FIG. 15 may form an obtuse angle relative to the ground patch, in an embodiment.

FIGS. 18-20 show how the antenna element 1500 of FIG. 15 may form different angles relative to the ground patch 102 and system ground plane 108. In FIGS. 18-20, the antenna patch 104 is parallel to the ground patch 102, the antenna patch 104 is located directly above the ground patch 102 in the z direction, and the antenna patch 104 and system ground plane 108 are coplanar. The plane of the shorting wall 1506 forms an angle $\theta$ with the plane of the ground patch 102, and therefore forms the complementary angle $180°-\theta$ with the plane of the system ground plane 108. In FIG. 18, the angle $\theta$ is 90°, i.e., the shorting wall 1506 is perpendicular to the ground patch 102 and system ground plane 108. In FIG. 19, the angle $\theta$ is acute. In FIG. 20, the angle $\theta$ is obtuse. While FIGS. 18-20 show the sixth edge 132 connecting to the second edge 126, the shorting wall 1506 and antenna patch 104 may be translated in the x direction so that the sixth edge 132 connects entirely to the system ground plane 108, or entirely to the ground patch 102.

In the preceding discussion, the system ground plane 108 is described with the first ground-plane edge 304 forming a straight line in the first direction, and the second ground-plane edge 306 forming a straight line in the second direction. In these embodiments, the first edges 124 of the antenna elements 100 of the first linear array are collinear, lying parallel to the first direction. The first edges 124 of the antenna elements 100 of the second linear array are also referred to herein as third edges. The third edges are collinear, lying parallel to the second direction. Here, "collinear" means that the first edge 124 of one antenna element 100, when extended in space, would coincide with the first edge 124 of each other antenna element 100 of the first linear array. Similarly, the third edge of one antenna element 100, when extended in space, would coincide with the third edge of each other antenna element 100 of the second linear array. However, the first edges 124 of the first linear array may be non-collinear (e.g., parallel or skew) without departing from the scope hereof. Similarly, the third edges of the second linear array may be non-collinear without departing from the scope hereof.

The second edges 126 of the antenna elements 100 of the first linear array may be collinear, lying parallel to the first direction and coinciding with the first ground-plane edge 304. The second edges 126 of the antenna elements 100 of the second linear array are also referred to herein as fourth edges. The fourth edges may also be collinear, lying parallel to the second direction and coinciding with the second ground-plane edge 306. However, the second edges 126 of the first linear array may be non-collinear without departing from the scope hereof. Similarly, the fourth edges of the second linear array may be non-collinear without departing from the scope hereof.

The fifth edges 130 of the antenna elements 100 of the first linear array may be collinear, lying parallel to the first direction. The fifth edges 130 of the antenna elements 100 of the second linear array are also referred to herein as seventh edges. The seventh edges may also be collinear, lying parallel to the second direction. However, the fifth edges 130 of the first linear array may be non-collinear without departing from the scope hereof. Similarly, the seventh edges of the second linear array may be non-collinear without departing from the scope hereof.

The sixth edges 132 of the antenna elements 100 of the first linear array may be collinear, lying parallel to the first direction and coinciding with the first ground-plane edge 304. The sixth edges 132 of the antenna elements 100 of the second linear array are also referred to herein as eighth edges. The eighth edges may also be collinear, lying parallel to the second direction and coinciding with the second ground-plane edge 306. However, the sixth edges 132 of the first linear array may be non-collinear without departing from the scope hereof. Similarly, the eighth edges of the second linear array may be non-collinear without departing from the scope hereof.

In other embodiments, one or both of the first ground-plane edge 304 and the second ground-plane edge 306 are curved. Thus, the ground-plane edges 304, 306 need not be straight. In these embodiments, the first edges and second edges may be similarly curved to align with the curved first ground-plane edge 304. Similarly, the third edges and fourth edges may be curved to align with the curved second ground-plane edge 306. In some embodiments, the first and second ground-plane edges 304, 306 are not orthogonal to each other. For example, the first and second ground-plane edges 304, 306 may form an acute angle or an obtuse angle.

In the preceding discussion, the antenna elements 100, 800, 1500 are described as being rectangular. Specifically, each antenna patch 104 and ground patch 102 are rectangular. However, each antenna patch 104 and ground patch 102 may have a different shape without departing from the scope hereof. For example, the antenna patch 104 and ground patch 102 may be semi-circular, triangular, or hexagonal. The antenna patch 104 and ground patch 102 may have similar geometries. More generally, the antenna patch 104 and ground patch 102 may be congruent. The antenna elements within one AOA antenna array may all have the same geometry (e.g., see FIG. 3). Alternatively, one AOA antenna array may include antenna elements with different geometries. For example, the antenna elements of one linear array may all have a first geometry, while the antenna elements of the second linear array may all have a second geometry that is different from the first geometry.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An angle-of-arrival antenna system, comprising:
an array of first antenna elements along a first direction, each of the first antenna elements having a first antenna patch positioned over a corresponding first ground patch, a first edge of the first antenna patch being parallel to the first direction, a second edge of the first ground patch being parallel to the first direction and electrically connected to the first edge;
an array of second antenna elements along a second direction orthogonal to the first direction, each of the second antenna elements having a second antenna patch positioned over a corresponding second ground patch, a third edge of the second antenna patch being parallel to the second direction, a fourth edge of the second ground patch being parallel to the second direction and electrically connected to the third edge;
a system ground plane having (i) a first ground-plane edge parallel to the first direction and directly electrically connected to each second edge, and (ii) a second ground-plane edge parallel to the second direction and directly electrically connected to each fourth edge;
a first shorting wall for each of the first antenna elements, the first shorting wall having opposed fifth and sixth edges parallel to the first direction, the first and fifth edges being directly electrically connected, the second and sixth edges being directly electrically connected; and
a second shorting wall for each of the second antenna elements, the second shorting wall having opposed seventh and eighth edges parallel of the second direction, the third and seventh edges being directly electrically connected, the fourth and eighth edges being directly electrically connected.

2. The angle-of-arrival antenna system of claim 1, wherein:
the array of first antenna elements has two first antenna elements; and
the array of second antenna elements has two second antenna elements.

3. The angle-of-arrival antenna system of claim 1, wherein:
the array of first antenna elements has three first antenna elements; and
the array of second antenna elements has three second antenna elements.

4. The angle-of-arrival antenna system of claim 1, the system ground plane being coplanar with each first ground patch and each second ground patch.

5. The angle-of-arrival antenna system of claim 1,
the first antenna elements being equally spaced along the first direction by a first spacing less than one-half of a center wavelength; and
the second antenna elements being equally spaced along the second direction by a second spacing less than one-half of the center wavelength.

6. The angle-of-arrival antenna system of claim 1, further comprising a solid dielectric material between each first antenna patch and its corresponding first ground patch, and between each second antenna patch and its corresponding second ground patch.

7. The angle-of-arrival antenna system of claim 1, further comprising air between each first antenna patch and its corresponding first ground patch, and between each second antenna patch and its corresponding second ground patch.

8. The angle-of-arrival antenna system of claim 1, wherein:
each first antenna patch lies parallel to its corresponding first ground patch; and
each second antenna patch lies parallel to its corresponding second ground patch.

9. The angle-of-arrival antenna system of claim 1, wherein:
each first antenna patch and corresponding first ground patch have a similar geometry; and
each second antenna patch and corresponding second ground patch have a similar geometry.

10. The angle-of-arrival antenna system of claim 9, the similar geometry being selecting from the group consisting of: semi-circular, rectangular, triangular, and hexagonal.

11. The angle-of-arrival antenna system of claim 1, wherein:
the first edges are collinear;
the second edges are collinear;
the third edges are collinear; and
the fourth edges are collinear.

12. The angle-of-arrival antenna system of claim 1, wherein:
the fifth edges are collinear;
the sixth edges are collinear;
the seventh edges are collinear; and
the eighth edges are collinear.

13. The angle-of-arrival antenna system of claim 1, wherein:
each first shorting wall lies perpendicularly to its corresponding first antenna patch and first patch ground; and
each second shorting wall lies perpendicularly to its corresponding second antenna patch and second patch ground.

14. The angle-of-arrival antenna system of claim 1, further comprising:
for each first antenna element of the array of first antenna elements:
a first antenna feed passing through the first ground patch of said each first antenna element and being directly electrically connected to the first antenna patch of said each first antenna element; and
for each second antenna element of the array of second antenna elements:
a second antenna feed passing through the second ground patch of said each second antenna element and being directly electrically connected to the second antenna patch of said each second antenna element.

15. The angle-of-arrival antenna system of claim 1, further comprising a circuit board with a plurality of layers, wherein:
each first and second antenna patch comprises metal disposed on a first layer of the plurality of layers;
each first and second ground patch comprises metal disposed on a second layer of the plurality of layers; and
the system ground plane comprises metal disposed on the second layer.

16. The angle-of-arrival antenna system of claim 15, further comprising:
for each first antenna element of the array of first antenna elements:
a first transmission line disposed on a third layer of the plurality of layers; and
a first feedline via passing through all of the plurality of layers, the first feedline via directly electrically connecting the first transmission line to the first antenna patch of said each first antenna element;
wherein the first ground patch of said each first antenna element forms an electrically non-conductive ring around the first feedline via such that the first feedline via is not shorted to the first ground patch; and
for each second antenna element of the array of second antenna elements:
a second transmission line disposed on a third layer of the plurality of layers; and
a second feedline via passing through all of the plurality of layers, the second feedline via directly electrically connecting the second transmission line to the second antenna patch of said each second antenna element;
wherein the second ground patch of said each second antenna element forms a non-electrically-conductive hole around the second feedline via such that the second feedline via is not shorted to the second ground patch.

17. The angle-of-arrival antenna system of claim 16, further comprising a switch soldered to the circuit board such that each input of the switch is electrically connected to either one first transmission line or one second transmission line.

18. The angle-of-arrival antenna system of claim 16, further comprising:
an array of vias passing through all of the plurality of layers to electrically connect the first and second edges of each of the first antenna elements; and
an array of vias passing through all of the plurality of layers to electrically connect the third and fourth edges of each of the second antenna elements.

19. The angle-of-arrival antenna system of claim 15, further comprising:
for each first antenna element of the array of first antenna elements:
collinear first and second arrays of vias passing through all of the plurality of layers to electrically connect the first and second edges of said each first antenna element;
a first transmission line disposed on a third layer of the plurality of layers and passing between a first gap between the collinear first and second arrays of vias; and
a first feedthrough via passing through all of the plurality of layers and directly electrically connecting the first transmission line to the first antenna patch of said each first antenna element; and
for each second antenna element of the array of second antenna elements:
collinear third and fourth arrays of vias passing through all of the plurality of layers to electrically connect the third and fourth edges of said each second antenna element;

a second transmission line disposed on the third layer and passing between a second gap between the collinear third and fourth arrays of vias; and a second feedthrough via passing through all of the plurality of layers and directly electrically connecting the second transmission line to the second antenna patch of said each second antenna element.

* * * * *